(12) United States Patent
Shin et al.

(10) Patent No.: US 11,853,474 B2
(45) Date of Patent: Dec. 26, 2023

(54) ALGORITHMICALLY ADJUSTING THE HIT BOX OF ICONS BASED ON PRIOR GAZE AND CLICK INFORMATION

(71) Applicant: Google LLC, Mountain View, CA (US)

(72) Inventors: Dongeek Shin, Santa Clara, CA (US); Ricardo John Campbell, Redwood City, CA (US); Jingying Hu, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/662,175

(22) Filed: May 5, 2022

(65) Prior Publication Data
US 2023/0359271 A1    Nov. 9, 2023

(51) Int. Cl.
*G06F 3/01* (2006.01)

(52) U.S. Cl.
CPC .................. *G06F 3/013* (2013.01)

(58) Field of Classification Search
CPC ........................................................ G06F 3/013
See application file for complete search history.

(56) References Cited

U.S. PATENT DOCUMENTS

| | | | | |
|---|---|---|---|---|
| 5,627,567 A * | 5/1997 | Davidson | .............. | G06F 3/0488 715/702 |
| 5,963,671 A * | 10/1999 | Comerford | .......... | G06V 30/268 382/230 |
| 6,323,884 B1 * | 11/2001 | Bird | .................... | G06F 3/04812 715/810 |
| 7,844,914 B2 * | 11/2010 | Andre | ................. | G06F 3/04883 715/773 |
| 2004/0178994 A1 * | 9/2004 | Kairls, Jr. | ............. | G06F 3/0418 345/173 |
| 2015/0049112 A1 * | 2/2015 | Liu | ....................... | G02B 27/017 345/633 |
| 2017/0160908 A1 * | 6/2017 | Feit | ......................... | G06F 3/013 |
| 2017/0293402 A1 * | 10/2017 | Morris | .................. | G06F 3/0482 |
| 2017/0351329 A1 * | 12/2017 | Picard | .................... | G06V 10/44 |
| 2018/0173417 A1 | 6/2018 | Foresti | | |
| 2020/0133450 A1 | 4/2020 | Lu et al. | | |
| 2022/0397975 A1 | 12/2022 | Iliffe-Moon | | |

OTHER PUBLICATIONS

Introduction to Probability; https://www.tutorialspoint.com/dip/introduction_to_probability.htm (Year: 2014).*
International Search Report and Written Opinion for PCT Application No. PCT/US2023/021129, dated Jul. 26, 2023, 14 pages.

* cited by examiner

*Primary Examiner* — Mihir K Rayan
(74) *Attorney, Agent, or Firm* — Brake Hughes Bellermann LLP (57) ABSTRACT

A method including determining historical user data associated with an event occurring on a wearable device, determining a probability of interacting with an object on a display of the wearable device based on the historical user data, scaling a hitbox associated with the object to form a scaled hitbox, detecting a user input based on an eye tracking being within the scaled hitbox, and in response to detecting the user input, initiating an action corresponding to the object.

18 Claims, 8 Drawing Sheets

ALGORITHMICALLY ADJUSTING THE HIT BOX OF ICONS BASED ON PRIOR GAZE AND CLICK INFORMATION

FIELD

Implementations relate to user input interfaces (e.g., a pointing device) in wearable devices including display(s).

BACKGROUND

Head-worn computing devices (e.g., smart glasses) may be configured with a variety of sensors to enable augmented reality (AR), in which virtual elements are presented with real elements of an environment. The virtual elements may be presented on a heads-up display. The virtual elements may appear as if they were located in the real world or may not appear (e.g., a system menu) as if they were located in the real world. The heads-up display can be implemented in devices resembling eyeglasses (i.e., AR glasses).

SUMMARY

In a general aspect, a wearable device, a system, a non-transitory computer-readable medium (having stored thereon computer executable program code which can be executed on a computer system), and/or a method can perform a process with a method including determining historical user data associated with an event occurring on a wearable device, determining a probability of interacting with an object on a display of the wearable device based on the historical user data, scaling a hitbox associated with the object to form a scaled hitbox, detecting a user input based on an eye tracking being within the scaled hitbox, and in response to detecting the user input, initiating an action corresponding to the object.

Implementations can include one or more of the following features. For example, the historical user data can include single frame user interactions with objects on the display of the wearable device, and the determining of the probability of interacting with the object can be based on a histogram of the historical user data. The historical user data can include multiple frame user interactions with objects on the display of the wearable device, the historical user data can include a temporal history, and the determining of the probability of interacting with the object can be based on a prior distribution of object interactions on each frame and the temporal history. The historical user data can include multiple frame user interactions with objects on the display of the wearable device, the historical user data can include a temporal history, and the determining of the probability of interacting with the object can be based on a joint prior of object interactions on each frame and the temporal history. The historical user data can include a focus tendency, the scaling of the hitbox associated with the object can be based on the focus tendency, and the hitbox can be scaled non-uniformly based on the focus tendency.

The determining of the probability of interacting with the object on the display of the wearable device can include determining a first probability of selecting a first object. The method can further include determining a second probability of interacting with a second object on a display of the wearable device based on the historical user data and the selecting of the first object, scaling a second hitbox associated with the second object, detecting a second user input based on an eye tracking being within the scaled second hitbox, and in response to detecting the user input, initiating a second action corresponding to the second object. The eye tracking can includes determining a cartesian coordinate on the display of the wearable device, and the cartesian coordinate can be filtered in time. The method can further include storing historical user data associated with a selected object on the display of the wearable device.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations and wherein.

It should be noted that these Figures are intended to illustrate the general characteristics of methods, structure and/or materials utilized in certain example implementations and to supplement the written description provided below. These drawings are not, however, to scale and may not precisely reflect the precise structural or performance characteristics of any given embodiment and should not be interpreted as defining or limiting the range of values or properties encompassed by example implementations. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Input routines for wearable devices can be enabled by an eye tracking (ET) module plus a wristband (WB). This combination can operate similar to a mouse interface, where the gaze estimated by ET can function as the pointing/scrolling and the finger pinch gesture indirectly detected by the WB can function as the click on a physical mouse. However, unlike a mouse which is a physical interface, an ET+WB interaction framework can rely on perception algorithms and data-driven algorithms. As such, the ET+WB interaction framework can operate with some amount of error. For example, in the ET module errors can be quantified using angular deviation metrics (e.g., a target is at (x=30, y=40) in degrees and the ET module can predict (x=31, y=45)). For example, in the WB module errors could be quantified using binary detection metrics (e.g., precision-recall).

Example implementations can use historical user data to predict a likely user input and modify a size of a generated hitbox (e.g., a background hit detection element associated with a rendered icon, a rendered button, a rendered menu item, and/or the like) such that a hitbox associated with the likely user input is larger than any other hitbox(s). Example implementations can reduce an error associated with the ET module using the described techniques.

Figure 1A:
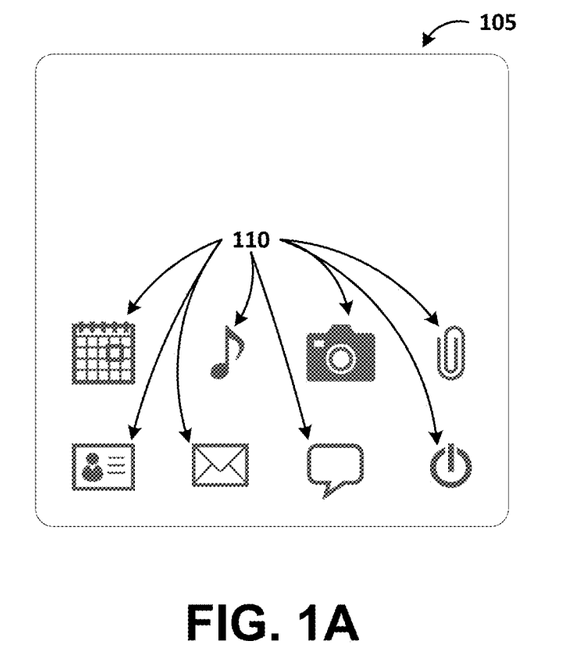
FIG. 1A, FIG. 1B, FIG. 1C, and FIG. 1D illustrate a drawing of a heads-up display according to an example implementation.

FIG. 1A, FIG. 1B, FIG. 1C, and FIG. 1D illustrate a drawing of a heads-up display according to an example implementation. Referring to FIG. 1A, a plurality of icons 110 (hereinafter referred to as icon 110) can be rendered on a display 105. The display 105 can be associated with a wearable device. For example, the display 105 can be a heads-up display associated with a head mounted display (e.g., smart glasses). For example, the display 105 can be a heads-up display associated with AR glasses 500 described below. Hereinafter, the device that includes the display 105 will be referred to as a wearable device (that can include a head mounted display, smart glasses, AR glasses, and/or the like).

Icon 110 can be a user interface (UI) that causes an action to be performed by the wearable device. The action can be rendering items including, for example, information, a UI, a home screen, a previous item, a menu, settings, and/or the like. The action can cause the wearable device to power on/off, play/pause/stop audio, play/pause/stop video, interact with an assistant, and/or the like. In an example implementation, an ET+WB interaction framework can be used by a user of the wearable device to interact with (e.g., select) an icon 110.

Figure 1B:
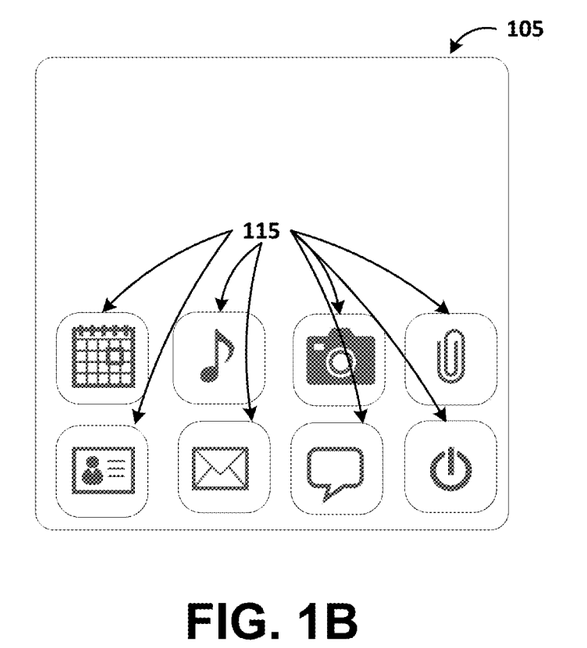

Referring to FIG. 1B, each icon 110 has an associated hitbox 115. Hitbox 115 is not visible to the user of the wearable device. In other words, the hitbox 115 is not rendered on the display 105. Each hitbox 115 can be associated with a number of pixels of the display 105. Each hitbox 115 can be associated with a region of pixels of the display 105. Each pixel of the display 105 and the region of pixels of the display 105 can be associated with cartesian (x, y) coordinates of the display 105. In an example implementation, the user of the wearable device focuses on an icon 110 and the ET module can be configured to determine (e.g., using an eye tracking function) a cartesian coordinate on the display 105 associated with the view of the user of the wearable device. If the cartesian coordinate associated with the view of the user of the wearable device is within the region of pixels of the display 105 associated with the hitbox 115 of an icon 110, the icon 110 is interacted with (e.g., in response to a finger pinch gesture detected by the WB).

Figure 1C:
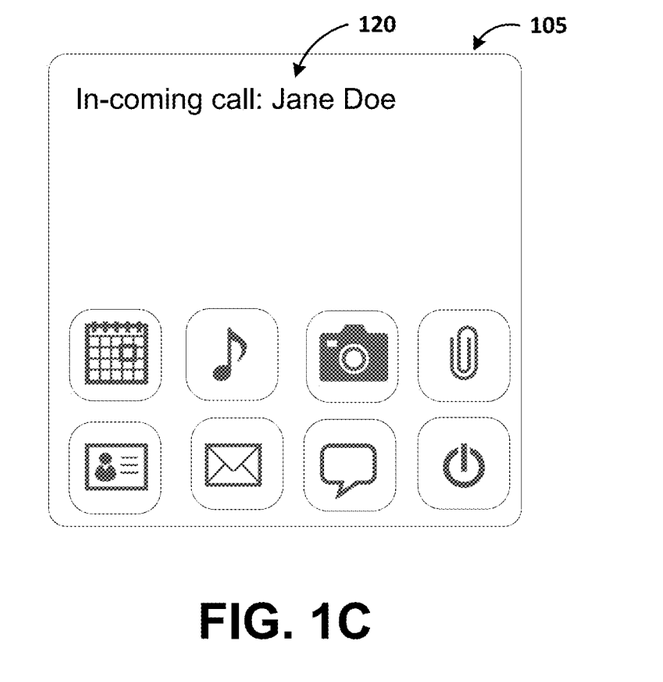
Figure 1D:
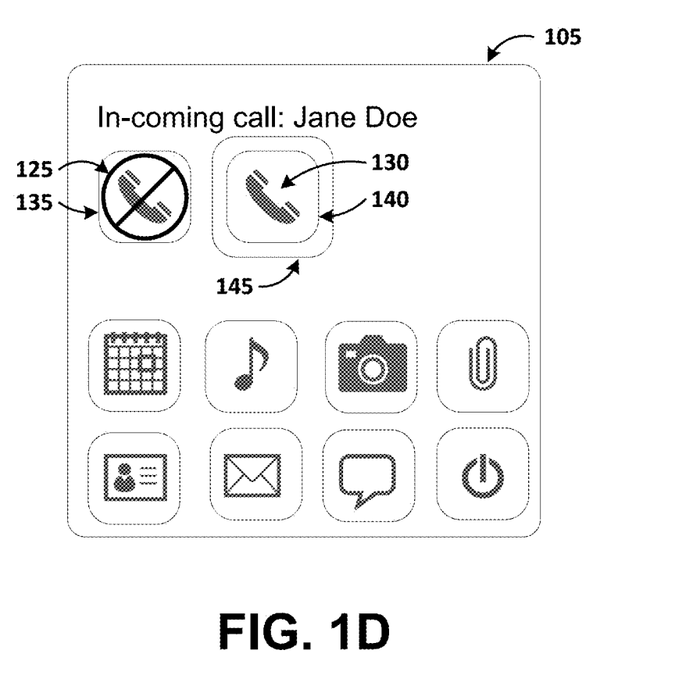

Referring to FIG. 1C, as an example, an incoming phone call can be received by the wearable device. The user can be notified of the incoming phone call by a rendered message 120 (e.g., in-coming call). Referring to FIG. 1D, as an example, in response to the incoming phone call icon 125 and icon 130 can be rendered on the display 105. Interacting with icon 125 can cause the incoming phone call to be rejected and interacting with icon 130 can cause the incoming phone call to be answered.

Hitbox 135 and hitbox 140 identify the region of pixels of the display 105 that the user views (e.g., using an eye tracking function of the ET module) to interact with the respective icon 125, 130. However, as discussed above, an error associated with the ET module can cause the interaction with the respective icon 125, 130 not to be detected by the wearable device. Therefore, the action associated with the respective icon 125, 130 may not be initiated. In this example, the phone call would not be answered or rejected.

In an example implementation, hitbox 145 identifies the region of pixels of the display 105 that are associated with icon 130. Hitbox 145 can be generated based on historical user data. For example, the historical user data can indicate that the user of the wearable device is likely to answer a phone call from, for example, Jane Doe. Therefore, hitbox 145 is generated to include a larger region of pixels of the display 105 as compared to the hitbox 135, 140. In other words, the user of the wearable device is predicted as likely answering the incoming phone call by interacting with icon 130. Therefore, hitbox 145 is generated to include a larger region of pixels of the display 105 such that an error associated with the ET module can be minimized resulting in the likelihood of the interaction with icon 130 causing the corresponding action (e.g., to answer the phone call) to be initiated by the wearable device (or a companion device). As mentioned above, Hitbox 135, 140, 145 is not visible to the user of the wearable device. In other words, the hitbox 135, 140, 145 is not rendered on the display 105.

Figure 2:
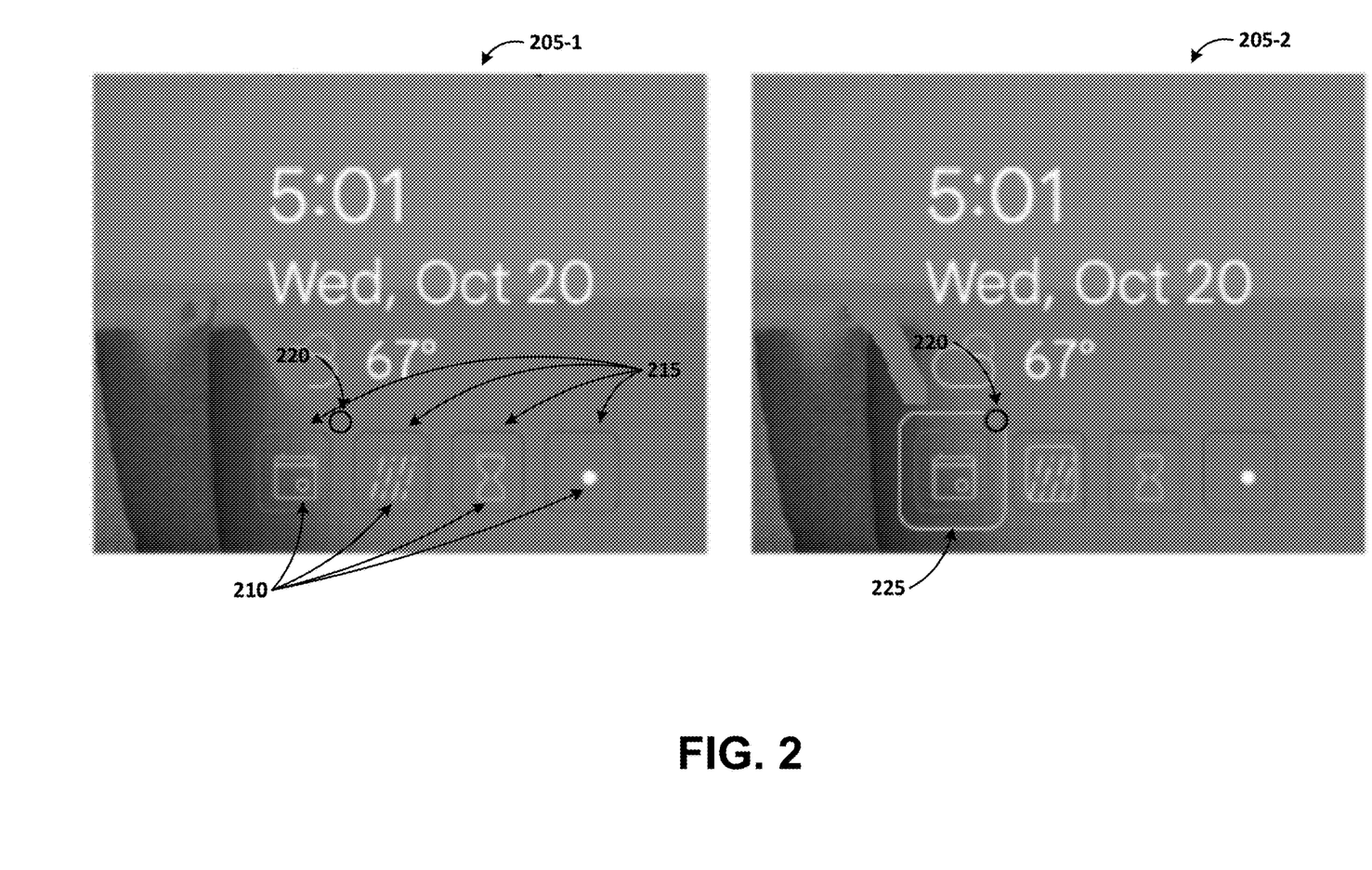
FIG. 2 illustrates a heads-up display according to an example implementation.

FIG. 2 illustrates a heads-up display according to an example implementation. FIG. 2 shows a pictorial representation of a heads-up display 205-1, 205-2. Heads-up display 205-1, 205-2 include icon 210. Each icon 210 has an associated hitbox 215. As mentioned above, hitbox 215 is not visible to the user of the wearable device. Heads-up display 205-1, 205-2 can include other rendered information. Time, date, and weather are shown on the heads-up display 205-1, 205-2. However, other displayable information is within the scope of this disclosure. Heads-up display 205-1, 205-2 can be in a first state (e.g., the home screen).

In this example, the user of the wearable device may want to switch the heads-up display 205-1, 205-2 to a second state. For example, the user of the wearable device may want to view a calendar. Therefore, the user of the wearable device may focus on the calendar icon (e.g., the leftmost icon 210) and the ET module can be configured to determine (e.g., using an eye tracking function) a cartesian coordinate 220 on the heads-up display 205-1 associated with the view of the user of the wearable device. In this example, the cartesian coordinate 220 is shown as being outside of the region of pixels of the heads-up display 205-1 corresponding to the hitbox 215 for the calendar icon (e.g., the leftmost icon 210). Therefore, the action corresponding to the calendar icon (e.g., the leftmost icon 210 will not initiate and the heads-up display 205-1 will not switch to the second state (e.g., open a calendar UI).

In an example implementation, as shown on the heads-up display 205-2, the hitbox 225 for the calendar icon (e.g., the leftmost icon 210) is generated to include a larger region of pixels of the heads-up display 205-2 as compared to the hitbox 215. Therefore, when the user of the wearable device focuses on the calendar icon (e.g., the leftmost icon 210) and the ET module determines (e.g., using an eye tracking function) the cartesian coordinate 220 on the heads-up display 205-2 associated with the view of the user of the wearable device, the cartesian coordinate 220 is shown as being within the region of pixels of the heads-up display 205-2 corresponding to the hitbox 225 for the calendar icon (e.g., the leftmost icon 210). Therefore, the action corresponding to the calendar icon (e.g., the leftmost icon 210) will initiate and the heads-up display 205-2 will switch to the second state (e.g., open a calendar UI).

Example implementations can mask the errors (discussed above) associated with ET+WB uncertainties using an algorithmic technique to adjust the hitboxes of the wearable device UI. For example, using the example described above with regard to FIGS. 1C and 1D, an incoming call can be received and icon 125, 130 can be rendered on the display 105. The rendered icon 125, 130 can give the user two options, either to accept or decline the incoming call. The hitbox 135, 140 will have a certain number of pixels allocated for the "accept" and "decline" icons, respectively.

In this example, if the hitbox 135, 140 both occupy 100 pixels then for the ET+WB combo model that has a two (2) sigma error around each icon 125, 130 center, a 95% accuracy for user to the hit the right button by looking and clicking (assuming the ET error function is gaussian and using the statistics empirical rule, sometimes called the 68-95-99.7 rule).

However, in an example implementation, the user's previous call history with the particular call initiator, the user could, for example, 80% of the time accept the call (e.g., the call is a work call or from a family member). This prior history can be directly used in generating the hitbox 145 in the UI (the "accept" hitbox would be slightly larger than the "decline" hitbox) to increase the posterior probability of the user hitting the intended icon, and in this case achieving a net accuracy of, for example, over 95%. As mentioned above, the example implementation does not modify the actual visualization of the UI, only hitbox 145. Call accept-decline is just one example; however, example implementations can be applied to shrink-or-grow wearable device display hitboxes to generic menu selection, user's likely travel route, shopping, lens, and/or the like. Another extension is that this doesn't have to be necessarily "frame-based"—the prior information could be gathered from an end-to-end (e2e), described below, flow (e.g., when glasses boot up, user first checks the calendar, then books a meeting, and so the icons that describe those two interaction points can scale in hitbox size). Therefore, example implementations can have a net accuracy boost due to incorporating prior information (e.g., histograms) of personalized routines.

A hitbox (e.g., hitbox 115, 135, 140, 215) can be scaled to increase the size of the region of pixels associated with the hitbox associated with the icon associated with the predicted likely user input. The hitbox scaling amount can be described or derived as follows:

Assume a fixed sys UI screen, with N options
For the i-th icon, define
  $c_i$ as the total count of user selecting icon i at the time of choice
  $a_i$ as the default hit box size of icon i
Then, $$p_i = c_i / \text{sum}(c_i)$$

describes the prior distribution probability p where sum $(p_i)=1$ due to normalization, and the scaled hitbox region could be:

$$a_i' = a_i * (1 + p_i^r)$$

where r>1 is the "damping factor" that can control the relative strength in growing or shrinking the hitbox size based on prior distributions. For example, if r is relatively high, then the hitbox renormalization becomes null. An example choice of r can be approximately 5.

Figure 3:
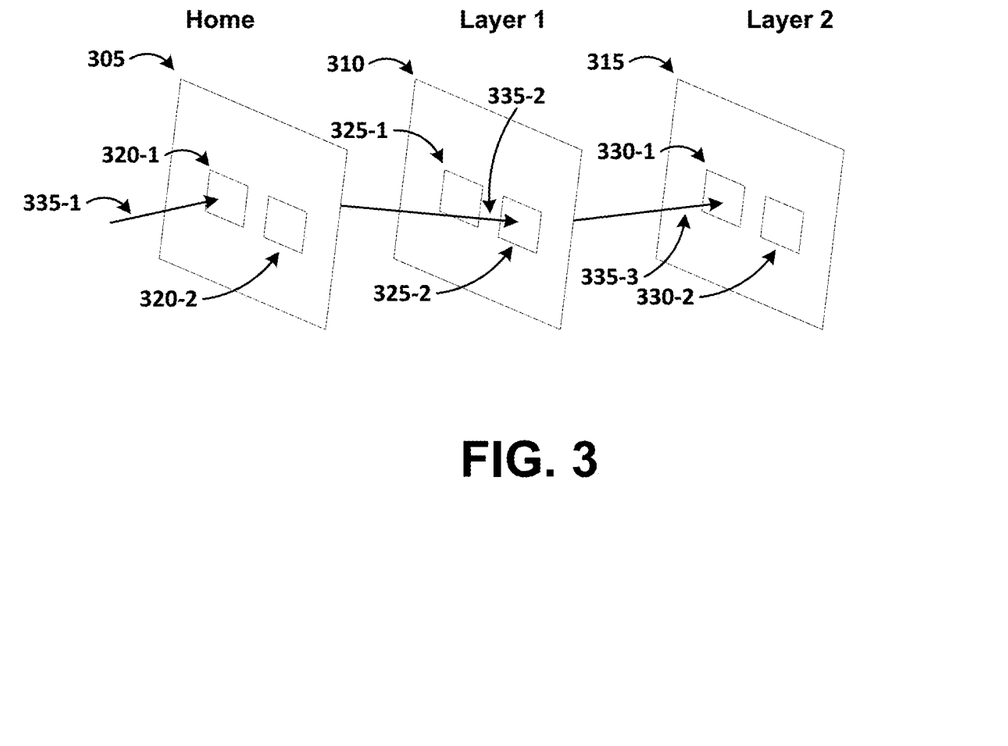
FIG. 3 illustrates a block diagram of sequential layers in a heads-up display according to an example implementation.

FIG. 3 illustrates a block diagram of sequential layers in a heads-up display according to an example implementation. FIG. 3 illustrates an example implementation where the historical user data user flow and/or the current user flow is flow-based or an end-to-end (e2e) flow. As shown in FIG. 3, a home layer 305, a layer 1 310, and a layer 2 315 can represent flow frames or display states in the user flow. The flow frames or display states can be UI representations where the home layer 305 is a home screen, the layer 1 310 is a UI state after a first user interaction, and the layer 2 315 is a UI state after a second user interaction. A UI state can be a rendering of a UI of a wearable device on a display of the wearable device.

Object 320-1, 320-2 is associated with the home layer 305. Object 320-1, 320-2 can represent objects (e.g., icons, menus, and the like) rendered on the display of the wearable device. Object 325-1, 325-2 is associated with the layer 1 310. Object 325-1, 325-2 can represent objects (e.g., icons, menus, and the like) rendered on the display of the wearable device. Object 330-1, 330-2 is associated with the layer 2 315. Object 330-1, 330-2 can represent objects (e.g., icons, menus, and the like) rendered on the display of the wearable device. As discussed above, the flow frames or display states can be UI representations where the home layer 305 is a home screen, the layer 1 310 is a UI state after a first user interaction, and the layer 2 315 is a UI state after a second user interaction. A UI state can be a rendering of a UI of a wearable device on a display of the wearable device. Therefore, object 320-1, 320-2 can represent objects rendered on a UI home screen, object 325-1, 325-2 can represent objects rendered on the UI after a first user interaction, and object 330-1, 330-2 can represent objects rendered on the UI after a second user interaction. Line 335-1, 335-2, 335-3 can represent an interaction flow where object 320-1 is interacted with (e.g., selected) on the home layer 305, object 325-2 is interacted with (e.g., selected) on the layer 1 310, and object 330-1 is interacted with (e.g., selected) on the layer 2 315.

In this example implementation, the user flow can represent a historical user flow. In this example, it may be useful to estimate the prior distribution that includes the temporal history as:

$$p(t_1, t_2) \propto p(t_2) * p(t_1 | t_2)$$

where,
  p is the probability (e.g., the probability of an object being interacted with) and
  t is a time stamp.

For a two-layer example, knowing the joint prior amounts to simply using the probability chain rule where the individual components could be histograms and plug-in estimated from user's history data. The joint prior can then replace the naive bayes prior ($=p_i$) to estimate the scaled hitbox $a_i'$ for a more refined result.

Figure 4:
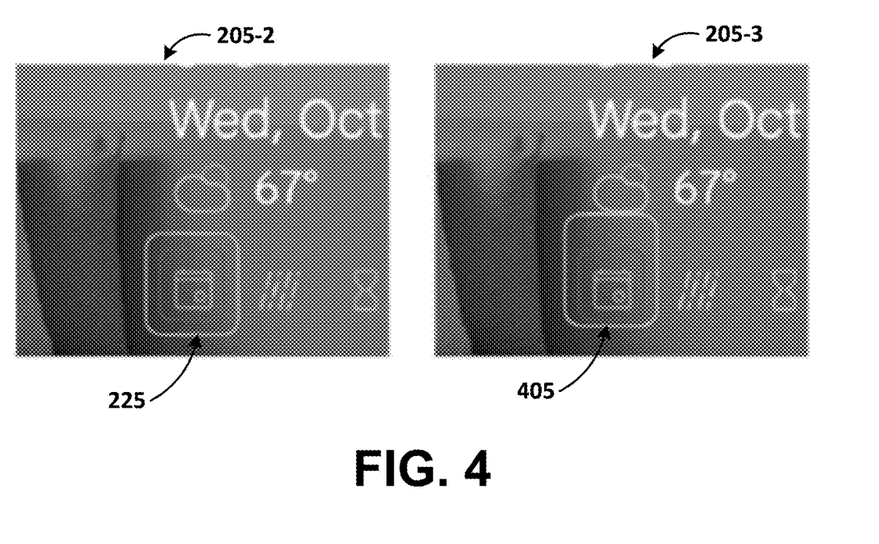
FIG. 4 illustrates a heads-up display according to an example implementation.

FIG. 4 illustrates a heads-up display according to an example implementation. In an example implementation, the hitbox can be scaled non-uniformly. For example, as shown in FIG. 4, heads-up display 205-2, 205-3 illustrate that a hitbox 405 is not uniformly scaled as compared to hitbox 225. For example, the hitbox 405 is illustrated as being extended in one direction (e.g., toward the top of heads-up display 205-3). As an example, a user on average can focus on the top of an icon 210 (e.g., the calendar icon) for clicking. In this example, this focus tendency can be detected and a learning of the icon prior probability and scaling its area as a whole, equally in the xy-plane could be suboptimal. Therefore, example implementations can consider information of user gaze deviation into the historical data and the scaling algorithm. The non-uniform scaling can reduce the error resulting in an improved successful hit rate.

Figure 5:
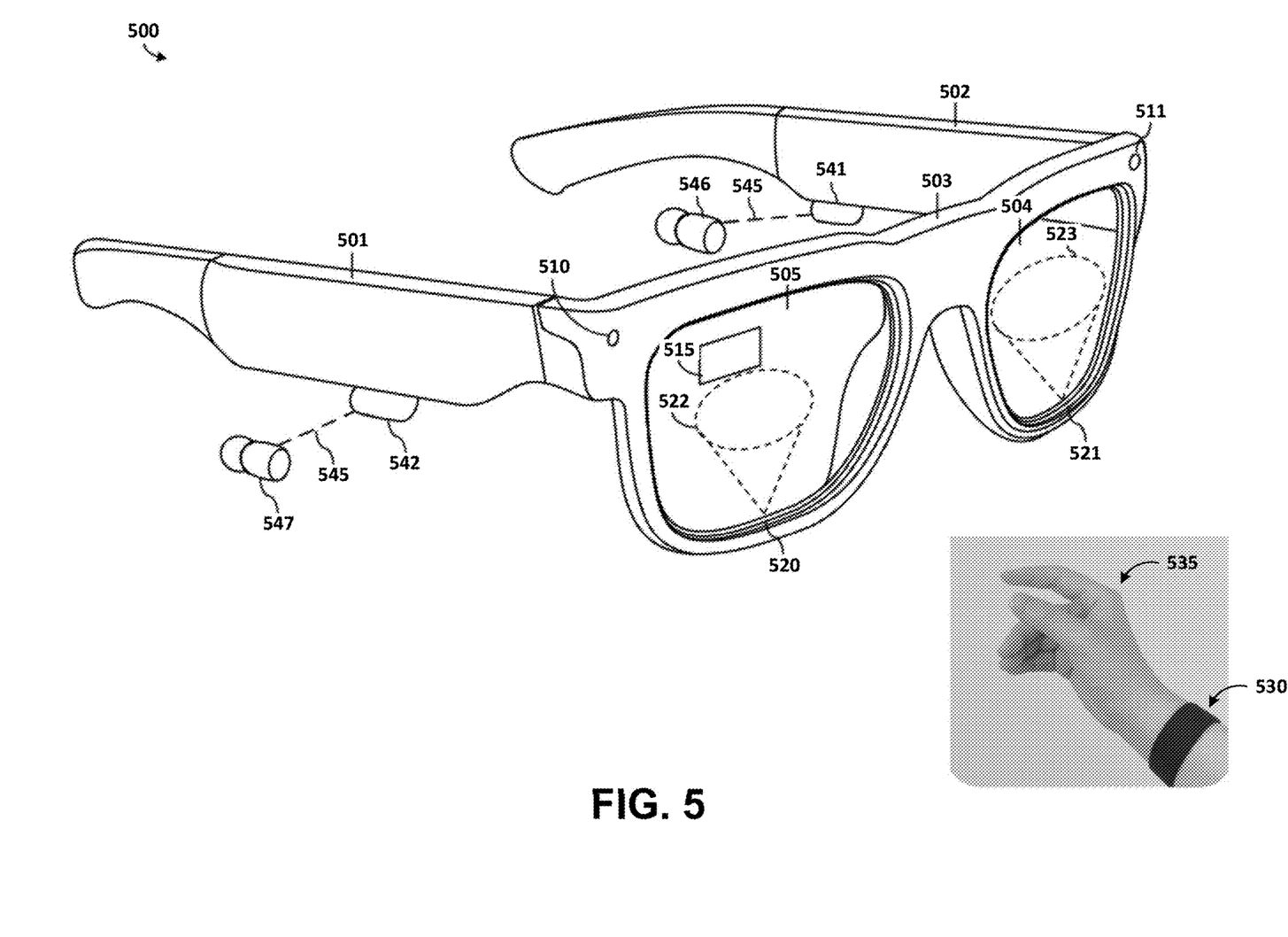
FIG. 5 illustrates a is a perspective view of AR glasses according to an example implementation.

FIG. 5 is a perspective view of AR glasses according to a possible implementation of the present disclosure. The AR glasses 500 can be a wearable device configured to be worn on a head and a face of a user. The AR glasses 500 include a right earpiece 501 and a left earpiece 502 that are supported by the ears of a user. The AR glasses further include a bridge portion 503 that is supported by the nose of the user so that a left lens 504 and a right lens 505 can be positioned in front a left eye of the user and a right eye of the user, respectively. The portions of the AR glasses can be collectively referred to as the frame of the AR glasses 500. The frame of the AR glasses 500 can contain electronics to enable function(s). For example, the frame may include a battery, a processor, a memory (e.g., non-transitory computer readable medium), and electronics to support sensors (e.g., cameras, depth sensors, etc.), and interface devices (e.g., speakers, display, network adapter, etc.). For example, the function can include generating and scaling hitboxes as described above.

The AR glasses 500 can include a FOV camera 510 (e.g., RGB camera) that is directed to a camera field-of-view that overlaps with the natural field-of-view of the user's eyes when the glasses are worn. In a possible implementation, the AR glasses can further include a depth sensor 511 (e.g., LIDAR, structured light, time-of-flight, depth camera) that is directed to a depth-sensor field-of-view that overlaps with the natural field-of-view of the user's eyes when the glasses are worn. Data from the depth sensor 511 and/or the FOV camera 510 can be used to measure depths in a field-of-view (i.e., region of interest) of the user (i.e., wearer). In a possible implementation, the camera field-of-view and the depth-sensor field-of-view may be calibrated so that depths (i.e., ranges) of objects in images from the FOV camera 510 can be determined, where the depths are measured between the objects and the AR glasses.

The AR glasses 500 can further include a display 515. The display may present AR data (e.g., images, graphics, text, icons, etc.) on a portion of a lens (or lenses) of the AR glasses so that a user may view the AR data as the user looks through a lens of the AR glasses. In this way, the AR data can overlap with the user's view of the environment.

The AR glasses 500 can further include an eye-tracking sensor. The eye tracking sensor can include a right-eye camera 520 and a left-eye camera 521. The right-eye camera 520 and the left-eye camera 521 can be located in lens portions of the frame so that a right FOV 522 of the right-eye camera includes the right eye of the user and a left FOV 523 of the left-eye camera includes the left eye of the user when the AR glasses are worn. A gaze point (x,y) can be determined at a frequency of the camera (e.g., right-eye camera 520, left-eye camera 521) video feed. For example, the gaze point coordinates (x,y) may be measured at the camera's frame rate (e.g., 15 frames-per-second) or less. The ET model can be configured to use the eye-tracking sensor and/or the gaze point coordinates (x,y) to predict and/or as the cartesian coordinate (e.g., the cartesian coordinate 220).

The AR glasses 500 can be communicatively coupled with a peripheral device 530. The peripheral device 530 can be configured to detect and/or sense a gesture associated with a user's hand 535. The peripheral device 530 can be or can include or can perform the WB function as described above. For example, the peripheral device 530 can be configured to detect or help detect a finger pinch gesture used to initiate the user interaction (e.g., select an icon) described above. Other gestures or techniques may be used to initiate the user interaction.

The AR glasses 500 may further include a left speaker 541 and a right speaker 542 configured to transmit audio to the user. Additionally, or alternatively, transmitting audio to a user may include transmitting the audio over a wireless communication link 545 to a listening device (e.g., hearing aid, earbud, etc.). For example, the AR glasses 500 may transmit audio to a left wireless earbud 546 and to a right earbud 547.

Figure 6:
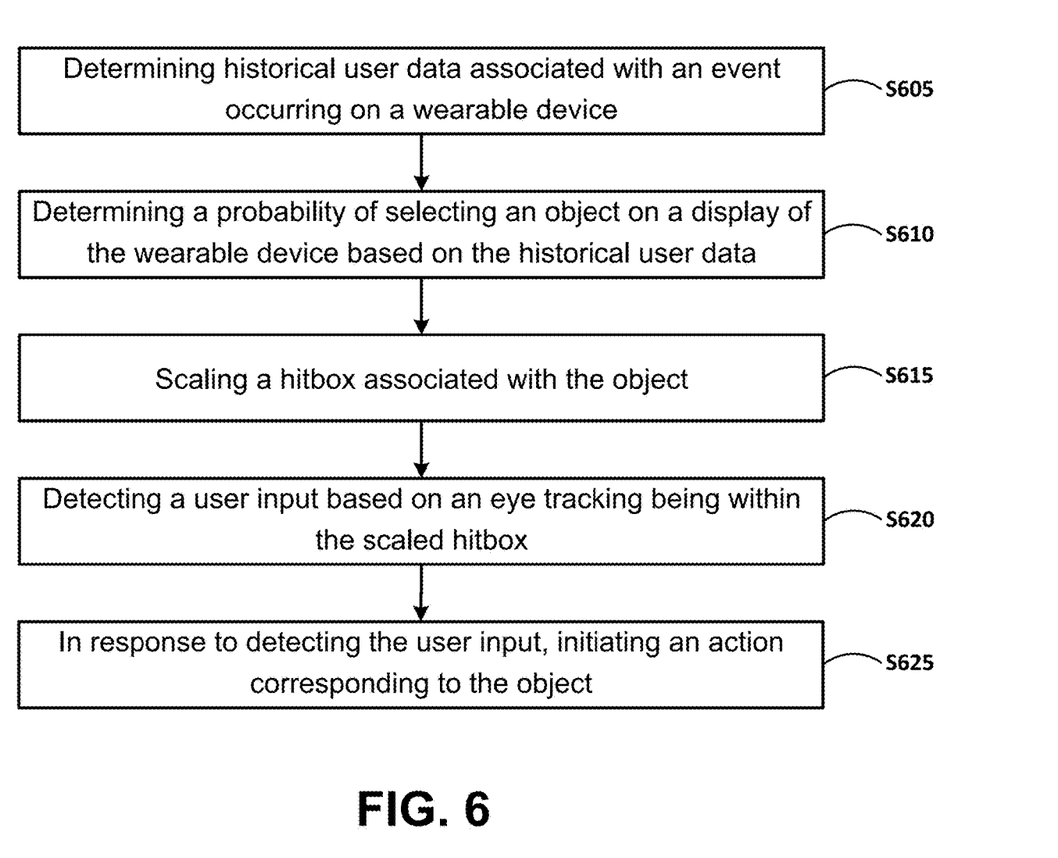
FIG. 6 illustrates a method of implementing a user interface in a Head-worn computing device according to an example implementation.

FIG. 6 illustrates a method of implementing a user interface in a Head-worn computing device according to an example implementation. As shown in FIG. 6, in step S605 historical user data associated with an event occurring on a wearable device is determined. For example, historical user data can be saved in a memory associated with a wearable device (e.g., AR glasses 500) and/or a companion device (e.g., a mobile phone communicatively coupled to the wearable device. The historical user data can be associated with interacting with (e.g., selecting) an object rendered on a display (e.g., display 105, 205) of the wearable device. The historical user data can be associated with an event that occurs on the wearable device (e.g., on the display of the wearable device). The historical user data can be stored in response to the object being interacted with in response to the event.

Accordingly, an event can occur on the wearable device (e.g., an incoming call is received), historical user data associated with the event can be read from the memory. The determining of the historical user data can include determining characteristics about the event (e.g., an incoming call and who the call is from) and filtering the historical user data based on the characteristics about the event. The historical user data can include a single frame of user interactions with objects on the display of the wearable device. The historical user data can include multiple frame user interactions with objects on the display of the wearable device. The historical user data can include a temporal history. A temporal history can include the multiple frame user interactions with objects such that each frame is timestamped. The determining of the historical user data can include recalling associated multiple frames ordered based on the timestamps.

In step S610 a probability of interacting with an object on a display of the wearable device is determined based on the historical user data. For example, a histogram of the historical user data can be generated. The histogram can include historical objects interacted with based on the event. The probability of interacting with an object on a display of the wearable device is determined can be based on the columns in the histogram. The histogram with the most entries can be the object with the highest probability of being interacted with. The determining of the probability of interacting with the object can be based on a prior distribution of object interactions on each frame and the temporal history. The determining of the probability of interacting with the object can be based on a joint prior of object interactions on each frame and the temporal history.

In step S615 a hitbox associated with the object is scaled. For example, the object with the highest probability of being interacted with can have an associated hitbox that is scaled. Scaling the hitbox can include increasing a size of the hitbox. The hitbox can be associated with a number of pixels of the display of the wearable device. The hitbox can be associated with a region of pixels of the display of the wearable device. Each pixel of the display and the region of pixels of the display can be associated with cartesian (x, y) coordinates of the display. Scaling the hitbox can include increasing the number of pixels in the region of pixels of the display corresponding to the hitbox. The historical user data can include focus tendency and the scaling of the hitbox associated with the object can be based on the focus tendency. The hitbox can be scaled non-uniformly based on the focus tendency.

In step S620 a user input is detected based on an eye tracking being within the scaled hitbox. For example, the user input can be detected using an ET+WB interaction framework. The eye tracking can include determining a cartesian coordinate on the display of the wearable device (e.g., using the ET module). The cartesian coordinate can be filtered in time (e.g., over multiple frames). The wearable device can be communicatively coupled with a peripheral device. The peripheral device can be configured to detect and/or sense a gesture associated with a user's hand. The peripheral device can be or can include or can perform the WB function as described above. For example, the peripheral device can be configured to detect or help detect a finger pinch gesture used to initiate the user interaction. The detected gesture can be combined with the eye tracking to generate the user input. Other gestures or techniques may be used to initiate the user interaction.

One possible method for eye tracking includes measuring eye metrics using cameras to determine a position of the eye. In one possible implementation, a pupil position may be measured relative to a pattern of light (near infra-red light) projected onto the eye by analyzing a high-resolution image of the eye and the pattern. Then, the position of the eye may be applied to machine learning models to determine the cartesian coordinate of a gaze point. Variations to this method that do not use the projected pattern are possible. For example, there are standard glint-based tracking or convolutional neural net approaches that can convert a two-dimensional (2D) infrared image captured by a camera pointed at the eye (or a reflected eye image from a mirror) into an coordinate (x,y) in a field-of-view of AR glasses Rapid eye movements (i.e., saccades) may make determining a gaze difficult. Accordingly, the method can further includes filtering the gaze coordinates in time. For example, the gaze coordinates from real-time eye tracking may be low-pass filtered in order to produce a time varying signal corresponding to gaze that varies less with time. In a possible implementation, eye tracking coordinates may be measured over time and average to obtain averaged eye tracking coordinates. The gaze direction of a user can be determined when the average eye tracking coordinates meet a criterion for a dwell time. For example, averaged eye tracking coordinates within a range (e.g., area) for longer than a threshold period can indicate a stable gaze.

In step S625, in response to detecting the user input, an action corresponding to the object is initiated. For example, the object can be an icon and the action can be initiated in response to interacting (e.g., selecting) the icon. For example, the incoming call can be accepted or rejected based on interacting with an icon. For example, the object can be a menu and the action can be initiated in response to interacting (e.g., selecting) an item in the menu.

In some implementations (e.g., with multiple frame user interactions with objects), more than one object is interacted with over a short period of time. The following is an example where two objects are interacted with. The determining of the probability of selecting the object on the display of the wearable device can be determining a first probability of selecting a first object. Then, a second probability of interacting with a second object on a display of the wearable device can be determined based on the historical user data and the selecting of the first object. A second hitbox associated with the second object can be scaled. A second user input can be detected based on an eye tracking being within the scaled second hitbox and, in response to detecting the user input, a second action corresponding to the second object can be initiated.

Figure 7:
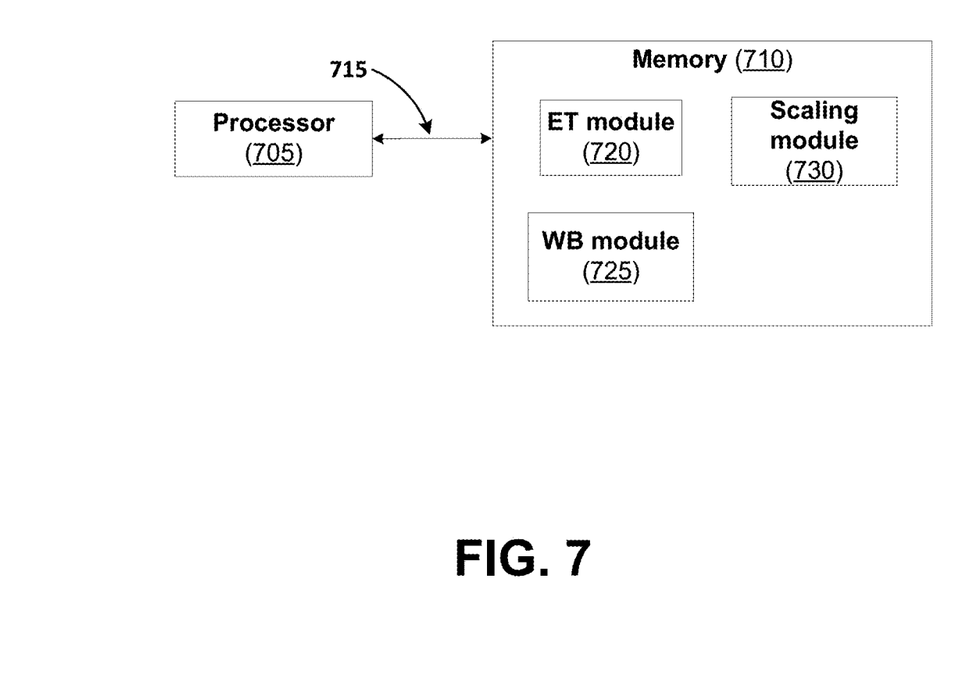
FIG. 7 illustrates a block diagram of a system corresponding to a Head-worn computing device according to an example implementation.

FIG. 7 illustrates a block diagram of a system corresponding to and/or including a wearable device (e.g., a wearable computing device, a head word display, smart glasses, AR glasses, a head mounted display, and/or the like) according to an example implementation. In the example of FIG. 7, the system (e.g., an augmented reality system, a virtual reality system, a companion device, and/or the like) can include a computing system or at least one computing device and should be understood to represent virtually any computing device configured to perform the techniques described herein. As such, the device may be understood to include various components which may be utilized to implement the techniques described herein, or different or future versions thereof. By way of example, the system can include a processor 705 and a memory 710 (e.g., a non-transitory computer readable memory). The processor 705 and the memory 710 can be coupled (e.g., communicatively coupled) by a bus 715.

The processor 705 may be utilized to execute instructions stored on the at least one memory 710. Therefore, the processor 705 can implement the various features and functions described herein, or additional or alternative features and functions. The processor 705 and the at least one memory 710 may be utilized for various other purposes. For example, the at least one memory 710 may represent an example of various types of memory and related hardware and software which may be used to implement any one of the modules described herein.

The at least one memory 710 may be configured to store data and/or information associated with the device. The at least one memory 710 may be a shared resource. Therefore, the at least one memory 710 may be configured to store data and/or information associated with other elements (e.g., image/video processing or wired/wireless communication) within the larger system. Together, the processor 705 and the at least one memory 710 may be utilized to implement the techniques described herein. As such, the techniques described herein can be implemented as code segments (e.g., software) stored on the memory 710 and executed by the processor 705. Accordingly, the memory 710 can include an ET module 720, a WB module 725, and a scaling module 730.

The ET module 720 can be configured to determine cartesian coordinate or gaze point coordinate associated with a gaze of a user of a wearable device. In an example implementation, the user of a wearable device can focus on an object (e.g., icon) and the ET module 720 can be configured to determine (e.g., using an eye tracking function) a cartesian coordinate on a display associated with the view of the user of the wearable device. The ET module 720 can be communicatively coupled to an eye-tracking sensor. The eye tracking sensor can include a right-eye camera and a left-eye camera. The right-eye camera and the left-eye camera can be located in lens portions of the frame so that a right FOV of the right-eye camera includes the right eye of the user and a left FOV of the left-eye camera includes the left eye of the user when the AR glasses are worn. The ET module 720 can be configured to determine a cartesian coordinate or gaze point at a frequency of the camera (e.g., right-eye camera, left-eye camera) video feed. For example, the gaze point coordinates (x,y) may be measured at the camera's frame rate (e.g., 15 frames-per-second) or less. The ET module 720 can be configured to use the eye-tracking sensor and/or the gaze point coordinates (x,y) to predict and/or as the cartesian coordinate (e.g., the cartesian coordinate 220).

The WB module 725 can be configured to receive a communication from a peripheral device and trigger an event based on the communication. For example, the event can be a "click" event associated with a pointing device. The peripheral device can be configured to detect and/or sense a gesture associated with a user's hand. The WB module 725 together with the peripheral device can be configured to detect or help detect a finger pinch gesture used to initiate the user interaction (e.g., select an icon) described above. Other gestures or techniques may be used to initiate the user interaction.

The scaling module 730 can be configured to scale (e.g., increase) a sized of a hitbox associated with a user interface based on historical user data. For example, the hitbox can be associated with a number of pixels of the display of the wearable device. The hitbox can be associated with a region of pixels of the display of the wearable device. Each pixel of the display and the region of pixels of the display can be associated with cartesian (x, y) coordinates of the display. Scaling the hitbox can include increasing the number of pixels in the region of pixels of the display corresponding to the hitbox.

Figure 8:
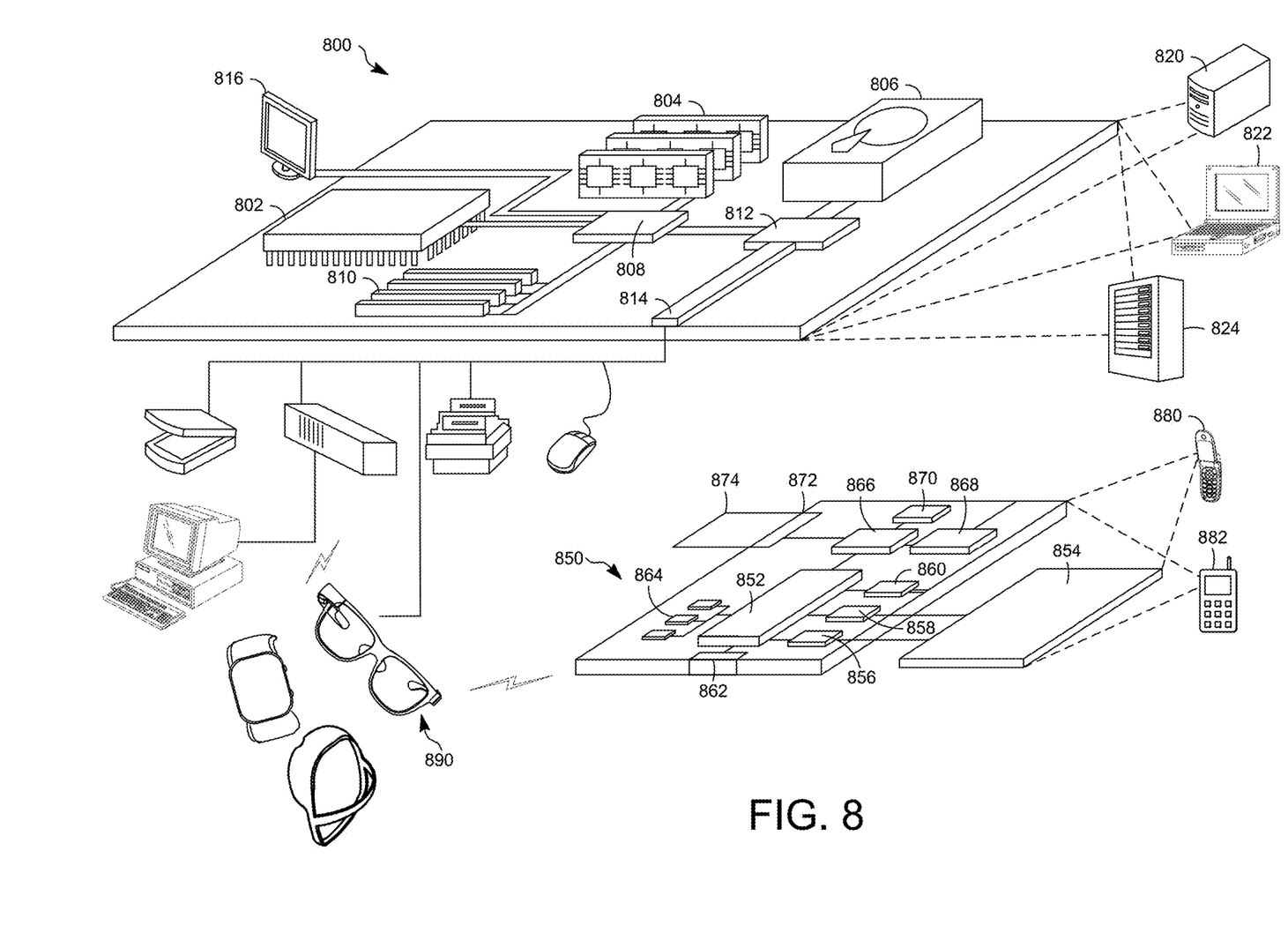
FIG. 8 shows an example of a computer device and a mobile computer device according to at least one example embodiment.

FIG. 8 illustrates an example of a computer device 800 and a mobile computer device 850, which may be used with the techniques described. The computing device 800 includes a processor 802, memory 804, a storage device 806, a high-speed interface 808 connecting to memory 804 and high-speed expansion ports 810, and a low-speed interface 812 connecting to low-speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high-speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high-speed controller 808 manages bandwidth-intensive operations for the computing device 800, while the low-speed controller 812 manages lower bandwidth-intensive operations. Such allocation of functions is example only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display), and LED (Light Emitting Diode) or an OLED (Organic Light Emitting Diode) display, or other appropriate display technology. The display interface 856 may include appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In-Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 890 to generate an augmented environment for viewing inserted content within the physical space. For example, one or more sensors included on a computing device 850 or other computing device depicted in the figure, can provide input to the AR headset 890 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 850 can use the sensors to determine an absolute position and/or a detected rotation of the computing device in the AR space that can then be used as input to the AR space. For example, the computing device 850 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 850 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 850 when the computing device is incorporated into the AR space can cause a particular action to occur in the AR space.

In some implementations, a touchscreen of the computing device 850 can be rendered as a touchpad in AR space. A user can interact with the touchscreen of the computing device 850. The interactions are rendered, in AR headset 890 for example, as movements on the rendered touchpad in the AR space. The rendered movements can control virtual objects in the AR space.

In some implementations, one or more output devices included on the computing device 850 can provide output and/or feedback to a user of the AR headset 890 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 850 may appear as another object in a computer-generated, 3D environment. Interactions by the user with the computing device 850 (e.g., rotating, shaking, touching a touchscreen, swiping a finger across a touch screen) can be interpreted as interactions with the object in the AR space. In the example of the laser pointer in an AR space, the computing device 850 appears as a virtual laser pointer in the computer-generated, 3D environment. As the user manipulates the computing device 850, the user in the AR space sees movement of the laser pointer. The user receives feedback from interactions with the computing device 850 in the AR environment on the computing device 850 or on the AR headset 890. The user's interactions with the computing device may be translated to interactions with a user interface generated in the AR environment for a controllable device.

In some implementations, a computing device 850 may include a touchscreen. For example, a user can interact with the touchscreen to interact with a user interface for a controllable device. For example, the touchscreen may include user interface elements such as sliders that can control properties of the controllable device.

Computing device 800 is intended to represent various forms of digital computers and devices, including, but not limited to laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
    determining historical user data associated with an event occurring on a wearable device, the historical user data including a focus tendency;

determining a probability of interacting with each of a plurality of objects on a display of the wearable device based on the historical user data;

scaling, based on the probability of interacting with each of the plurality of objects and based on the focus tendency, a hitbox associated with one of the plurality of objects to form a scaled hitbox, the hitbox being scaled non-uniformly based on the focus tendency;

detecting a user input based on an eye tracking being within the scaled hitbox; and in response to detecting the user input, initiating an action corresponding to the object associated with the scaled hitbox.

2. The method of claim 1, wherein
the historical user data includes single frame user interactions with objects on the display of the wearable device, and
the determining of the probability of interacting with the object is based on a histogram of the historical user data.

3. The method of claim 1, wherein
the historical user data includes multiple frame user interactions with objects on the display of the wearable device,
the historical user data includes a temporal history, and
the determining of the probability of interacting with the object is based on a prior distribution of object interactions on each frame and the temporal history.

4. The method of claim 1, wherein
the historical user data includes multiple frame user interactions with objects on the display of the wearable device,
the historical user data includes a temporal history, and
the determining of the probability of interacting with the object is based on a joint prior of object interactions on each frame and the temporal history.

5. The method of claim 1, wherein
the determining of the probability of interacting with each of the plurality of objects on the display of the wearable device includes determining a first probability of selecting a first object, the method further comprising:
determining a second probability of interacting with a second object on a display of the wearable device based on the historical user data and the selecting of the first object;
scaling a second hitbox associated with the second object;
detecting a second user input based on an eye tracking being within the scaled second hitbox; and
in response to detecting the user input, initiating a second action corresponding to the second object.

6. The method of claim 1, wherein
the eye tracking includes determining a cartesian coordinate on the display of the wearable device, and
the cartesian coordinate is filtered in time.

7. The method of claim 1, further comprising:
storing historical user data associated with a selected object on the display of the wearable device.

8. A wearable device comprising:
at least one processor; and
at least one memory including computer program code;
the at least one memory and the computer program code configured to, with the at least one processor, cause the wearable device to:
determine historical user data associated with an event occurring on a wearable device, the historical user data including a focus tendency;

determine a probability of interacting with each of a plurality of objects on a display of the wearable device based on the historical user data;

scale, based on the probability of interacting with each of the plurality of objects and based on the focus tendency, a hitbox associated with one of the plurality of objects to form a scaled hitbox, the hitbox being scaled non-uniformly based on the focus tendency;

detect a user input based on an eye tracking being within the scaled hitbox; and in response to detecting the user input, initiating an action corresponding to the object associated with the scaled hitbox.

9. The wearable device of claim 8, wherein
the historical user data includes single frame user interactions with objects on the display of the wearable device, and
the determining of the probability of interacting with the object is based on a histogram of the historical user data.

10. The wearable device of claim 8, wherein
the historical user data includes multiple frame user interactions with objects on the display of the wearable device,
the historical user data includes a temporal history, and
the determining of the probability of interacting with the object is based on a prior distribution of object interactions on each frame and the temporal history.

11. The wearable device of claim 8, wherein
the historical user data includes multiple frame user interactions with objects on the display of the wearable device,
the historical user data includes a temporal history, and
the determining of the probability of interacting with the object is based on a joint prior of object interactions on each frame and the temporal history.

12. The wearable device of claim 8, wherein
the determining of the probability of interacting with each of the plurality of objects on the display of the wearable device includes determining a first probability of selecting a first object, the computer program code is further configured to:
determine a second probability of interacting with a second object on a display of the wearable device based on the historical user data and the selecting of the first object;
scale a second hitbox associated with the second object;
detect a second user input based on an eye tracking being within the scaled second hitbox; and
in response to detecting the user input, initiate a second action corresponding to the second object.

13. The wearable device of claim 8, wherein
the eye tracking includes determining a cartesian coordinate on the display of the wearable device, and
the cartesian coordinate is filtered in time.

14. The wearable device of claim 8, wherein the computer program code is further configured to:
store historical user data associated with a selected object on the display of the wearable device.

15. A non-transitory computer-readable storage medium comprising instructions stored thereon that, when executed by at least one processor, are configured to cause an apparatus to:
determine historical user data associated with an event occurring on a wearable device, the historical user data including a focus tendency;

determine a probability of interacting with each of a plurality of objects on a display of the wearable device based on the historical user data;

scale, based on the probability of interacting with each of the plurality of objects and based on the focus tendency, a hitbox associated with one of the plurality of objects to form a scaled hitbox, the hitbox being scaled non-uniformly based on the focus tendency;

detect a user input based on an eye tracking being within the scaled hitbox; and in response to detecting the user input, initiating an action corresponding to the object associated with the scaled hitbox.

16. The non-transitory computer-readable storage medium of claim 15, wherein the historical user data includes single frame user interactions with objects on the display of the wearable device, and the determining of the probability of interacting with the object is based on a histogram of the historical user data.

17. The non-transitory computer-readable storage medium of claim 15, wherein the historical user data includes multiple frame user interactions with objects on the display of the wearable device, the historical user data includes a temporal history, and the determining of the probability of interacting with the object is based on a prior distribution of object interactions on each frame and the temporal history.

18. The non-transitory computer-readable storage medium of claim 15, wherein the determining of the probability of interacting with each of the plurality of objects on the display of the wearable device includes determining a first probability of selecting a first object, the instructions are further configured to:

determine a second probability of interacting with a second object on a display of the wearable device based on the historical user data and the selecting of the first object;

scale a second hitbox associated with the second object;

detect a second user input based on an eye tracking being within the scaled second hitbox; and in response to detecting the user input, initiate a second action corresponding to the second object.

* * * * *